United States Patent Office 3,651,093
Patented Mar. 21, 1972

3,651,093
BIS-TETRAHYDROPYRANYL SULFIDE
Paul R. Stapp, Bartlesville, Okla., assignor to
Phillips Petroleum Company
No Drawing. Filed Dec. 13, 1968, Ser. No. 783,737
Int. Cl. C07d 7/46
U.S. Cl. 260—345.9                    2 Claims

ABSTRACT OF THE DISCLOSURE

Novel bis-tetrahydropyranyl sulfides are prepared by reacting a halo-tetrahydropyran with an alkali metal or an alkaline earth metal sulfide. Bis-tetrahydropyranyl sulfones and sulfoxides can be prepared by oxidizing the bis-tetrahydropyranyl sulfide with hydrogen peroxide.

---

This invention relates to bis-tetrahydropyranyl sulfides and to a process for their production. In another aspect, this invention relates to bis-tetrahydropyranyl sulfones and sulfoxides and to a process for their production.

Heretofore, neither bis-tetrahydropyranyl sulfides, sulfones nor sulfoxides have been synthesized.

Accordingly, one object of this invention is to provide a process for the production of bis-tetrahydropyranyl sulfides, sulfones and sulfoxides. Another object is to provide the novel compounds bis-tetrahydropyranyl sulfide, bis-tetrahydropyranyl sulfone and bis-tetrahydropyranyl sulfoxide.

Other aspects, objects and advantages of this invention will be apparent to those skilled in the art from the following description and appended claims.

According to this invention, bis-tetrahydropyranyl sulfides are synthesized from halotetrahydropyrans and alkali metal or alkaline earth metal sulfides. Novel bis-tetrahydropyranyl sulfones and sulfoxides are prepared by reacting the bis-tetrahydropyranyl sulfides with a peroxide.

The former reaction can be represented as follows:

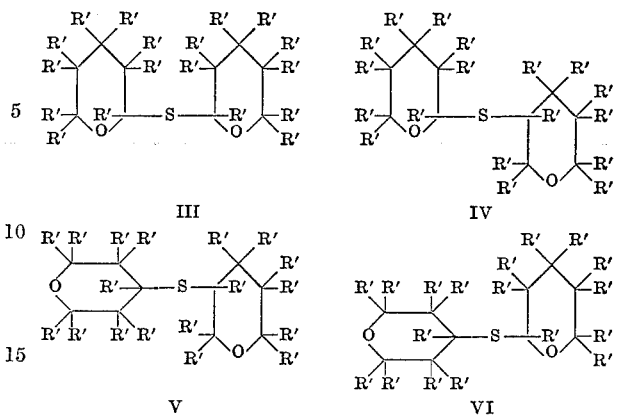

The bis-tetrahydropyranyl sulfides can be represented by any of the following six structures, numbered I through VI. In the above-mentioned reaction, one and only one R is a halogen such as fluorine, chlorine, bromine, or iodine, the remaining R groups are hydrogen or alkyl radicals having not more than 6 carbon atoms per R group and not more than 10 carbon atoms in all R groups per molecule, M is an alkali metal or an alkaline earth metal, and $n$ is 2 if M is an alkali metal or 1 if M is an alkaline earth metal.

The bis-tetrahydropyranyl sulfides that can be prepared according to the process of this invention include the compounds represented by the structures I through VI below:

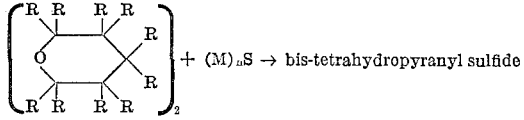

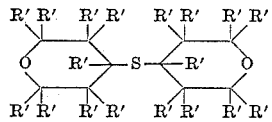
I

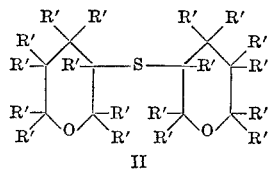
II wherein R' is hydrogen or an alkyl group having not more than 6 carbon atoms per R' group, and where there are not more than 10 carbon atoms in all R' groups on each ring.

To effect the synthesis of a bis-tetrahydropyranyl sulfide, an alkali metal or alkaline earth metal sulfide is admixed with a halotetrahydropyran under reaction conditions that can vary widely. Preferably, the mole ratio of alkali or alkaline earth sulfide to halotetrahydropyran is within the range of 0.05:1 to about 5:1. Generally, the reaction is carried out for a period of time from about 10 seconds to 24 hours, at a temperature from about 50 to 250° C., and under a pressure sufficient to maintain the reactants in a substantially liquid phase. A substantially nonreactive diluent can be employed, if desired. Specific examples of such diluents are hexane, benzene, N-methylpyrrolidone, ethanol, 2-butanol, methoxyethanol, tetrahydropyran, toluene, sulfolane, and the like. The diluents can comprise from about 1 to 95 weight percent of the reaction mixture.

The bis-tetrahydropyranyl sulfides can be converted to bis-tetrahydropyranyl sulfoxides by oxidizing the sulfides with a peroxide. The equivalent ratio of peroxide to bis-tetrahydropyranyl sulfide is in the range of about 0.8:1 to 1.2:1.

The bis-tetrahydropyranyl sulfides also can be converted to bis-tetrahydropyranyl sulfones by oxidizing the sulfides with a peroxide. The equivalent ratio of peroxide to bis-tetrahydropyranyl sulfide is in the range of about 1.8:1 to 2.2:1.

Any conditions known to the art for the conversion of a sulfide to a sulfone or a sulfoxide can be employed.

An exemplary conversion of bis-4-tetrahydropyranyl sulfide to a sulfoxide and a sulfone, respectively, is presented below:

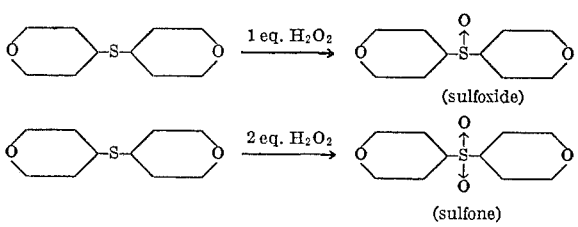

Of course, analogous conversions to respective sulfones and sulfoxides can be effected for any of the bis-tetrahydropyranyl sulfides represented by the structures I through VI hereinbefore mentioned.

The bis-tetrahydropyranyl sulfides represented above are useful in the preparation of extreme pressure lubricants. To prepare these lubricants, the bis-tetrahydropyranyl sulfides can be admixed with a mineral base oil in amounts within the range of 0.1 to 10 parts per hundred by weight of the oil. In addition, these lubricants can also be comprised of any other substance normally employed in the preparation of extreme pressure lubricants.

The bis-tetrahydropyranyl sulfones and sulfoxides of this invention can be used as antioxidants for polymers such as polybutadiene, polyisoprene, polypropylene, and the like. The sulfone or sulfoxide can be added to the polymer by any suitable means which effects a homogeneous distribution of the antioxidant in the polymer. The amount of sulfone or sulfoxide is within the range of 0.1 to 10 parts per hundred by weight of polymer. The antioxidant can be mixed with the polymer in any mechanical mixing techniques such as blending, milling, or kneading with devices such as a Henschel mixer, a Banbury mixer, a Bradender Plastograph, a Waring Blendor, a roll mill, and the like.

The advantages of this invention are further illustrated by the following examples. The reactants, proportions and other specific conditions are presented as being typical and should not be construed to limit the invention unduly.

EXAMPLE I

Under a nitrogen atmosphere, 180 grams of sodium sulfide nonahydrate and 850 milliliters of N-methylpyrrolidone were charged to a stirred reactor. Water was driven off by raising the reactor temperature to 200° C. After the reactor temperature was lowered to 140–150° C., 192.8 g. of 4-chlorotetrahydropyran were added and the temperature was maintained at about 140–150° C. for about 4 hours. Upon cooling, the reaction mixture was diluted with water and extracted with ether. The ether extract was washed with water and dried over magnesium sulfate. Volatiles were stripped from the ether extract on a rotary evaporator and the residue was distilled under reduced pressure. A yield of 53.4 grams of bis-4-tetrahydropyranyl sulfide was the product. IR analysis showed absorption bands for the sulfides that were consistent with the expected absorption bands for tetrahydropyran.

This example demonstrates the synthesis of a bis-tetrahydropyranyl sulfide.

EXAMPLE II

Under a nitrogen atmosphere, 60 grams of 4-chlorotetrahydropyran and 60 grams of sodium sulfide nonahydrate were admixed with 300 milliliters of formula 30 alcohol (1:10 MeOH:EtOH) Langes Handbook of Chemistry, 9th edition, Handbook Publishers, Inc. (1956), p. 1783, in a stirred reactor. The reactor contents were refluxed for 24 hours, cooled, and filtered through a Buchner funnel. The filtrate was stripped of volatiles on a rotary evaporator, and the residue was dissolved in an equal volume of ether and refiltered. The precipitate was dissolved in water and combined with the ether solution in a separatory funnel. The water solution was extracted two times with ether. The ether extracts were combined and dried over sodium sulfate, and the ether was stripped on a rotary evaporator. A yield of 6.1 grams of bis-tetrahydropyranyl sulfide was the product. IR analysis of this sulfide showed absorption bands that were consistent with the expected absorption bands for tetrahydropyran.

EXAMPLE III

The procedure of Example II was repeated, except that 300 milliliters of 2-methoxyethanol were used instead of 300 milliliters of formula 30 alcohol. A yield of 13.3 grams of bis-tetrahydropyranyl sulfide was the product.

The products of Examples II and III were combined and fractionally distilled under reduced pressure. A fraction having a boiling point in the range of 99–101° C. at 0.5 millimole Hg pressure, weighed 10.8 grams. The following table compares the experimentally found molecular weight and elemental composition of the product to their calculated counterpart.

TABLE I

|  | Calculated | Found |
| --- | --- | --- |
| Molecular weight | 202 | 202 |
| Elemental composition for $C_{10}H_{18}O_2S$, percent: |  |  |
| C | 59.4 | 59.4 |
| H | 8.9 | 9.1 |
| S | 15.8 | 15.5 |

IR analysis of this sulfide was comparable to that reported in Examples I and II. These examples further demonstrate the synthesis of a bis-tetrahydropyranyl sulfide.

EXAMPLE IV

To a stirred reactor containing 10 grams of bis-tetrahydropyranyl sulfide, prepared as above, and 100 milliliters of glacial acetic acid, was added 13 milliliters of 30 percent hydrogen peroxide over a period of 13 minutes at a temperature of 80° C. The exothermic reaction increased the reactor temperature to reflux temperature. The reaction mixture was stirred and cooled to room temperature for 2 hours. A small amount of palladium on carbon was added to decompose any excess hydrogen peroxide. The reaction mixture was filtered, and the filtrate was stripped of volatiles on a rotary evaporator. The residue weighed 18 grams and was recrystallized from 95 percent (vol.) ethanol to yield 11.1 grams of purified bis-tetrahydropyranyl sulfone. This product comprised a 95 percent mole yield based on the charged bis-4-tetrahydropyranyl sulfide. The melting point of the bis-tetrahydropyranyl sulfone was 156–157° C.

IR analysis showed that the sulfone bands were consistent with those of tetrahydropyran.

This example demonstrates the conversion of bis-tetrahydropyranyl sulfide to bis-tetrahydropyranyl sulfone.

EXAMPLE V

The procedure of Example IV was repeated, except that 6.6, rather than 13 milliliters, of hydrogen peroxide were employed. The product was 12.9 grams of bis-4-tetrahydropyranyl sulfoxide. Upon recrystallization from ethanol, a yield of 8.7 grams of purified bis-4-tetrahydropyranyl sulfoxide was recovered. This product comprised an 80 mole percent yield based on the charged 4-tetrahydropyranyl sulfide. The melting point of the bis-tetrahydropyranyl sulfoxide was 140–142° C. IR analysis showed sulfoxide bands and bands that were consistent with the bands of tetrahydropyran.

This example demonstrates the conversion of bis-tetrahydropyranyl sulfide to bis-tetrahydropyranyl sulfoxide.

EXAMPLE VI

A lubricant was prepared by admixing two parts of bis-4-tetrahydropyranyl sulfide, prepared as above, with 98 parts of SAE–10 Mid Continent base oil. Comparative runs were made with a Shell 4 ball machine and method. The data are shown in the following table.

TABLE II

Material: Scar size in microns
Base oil plus 2 percent bis-4-tetrahydropyranyl sulfide _____ 2475, 2451
Base oil above _____ 3975, 3474
Percent decrease in scar size, 37%, 29%.

This example demonstrates the usefulness of bis-tetrahydropyranyl sulfide in preparing antiwear lubricants.

Reasonable variations and modifications are possible within the scope of this disclosure without departing from the spirit and scope thereof.

I claim:
1. Bis-tetrahydropyranyl sulfide represented by the following structure:
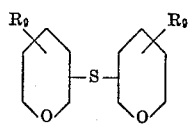
wherein each R is hydrogen.
2. Bis-4-tetrahydropyranyl sulfide.
References Cited
UNITED STATES PATENTS
2,949,487 8/1960 Rocklin _____ 260—609
3,374,274 3/1968 Spainhour _____ 260—609
NORMA S. MILESTONE, Primary Examiner
U.S. Cl. X.R.
252—406, 48.2; 260—45.8 A